United States Patent Office 3,525,090
Patented Aug. 18, 1970

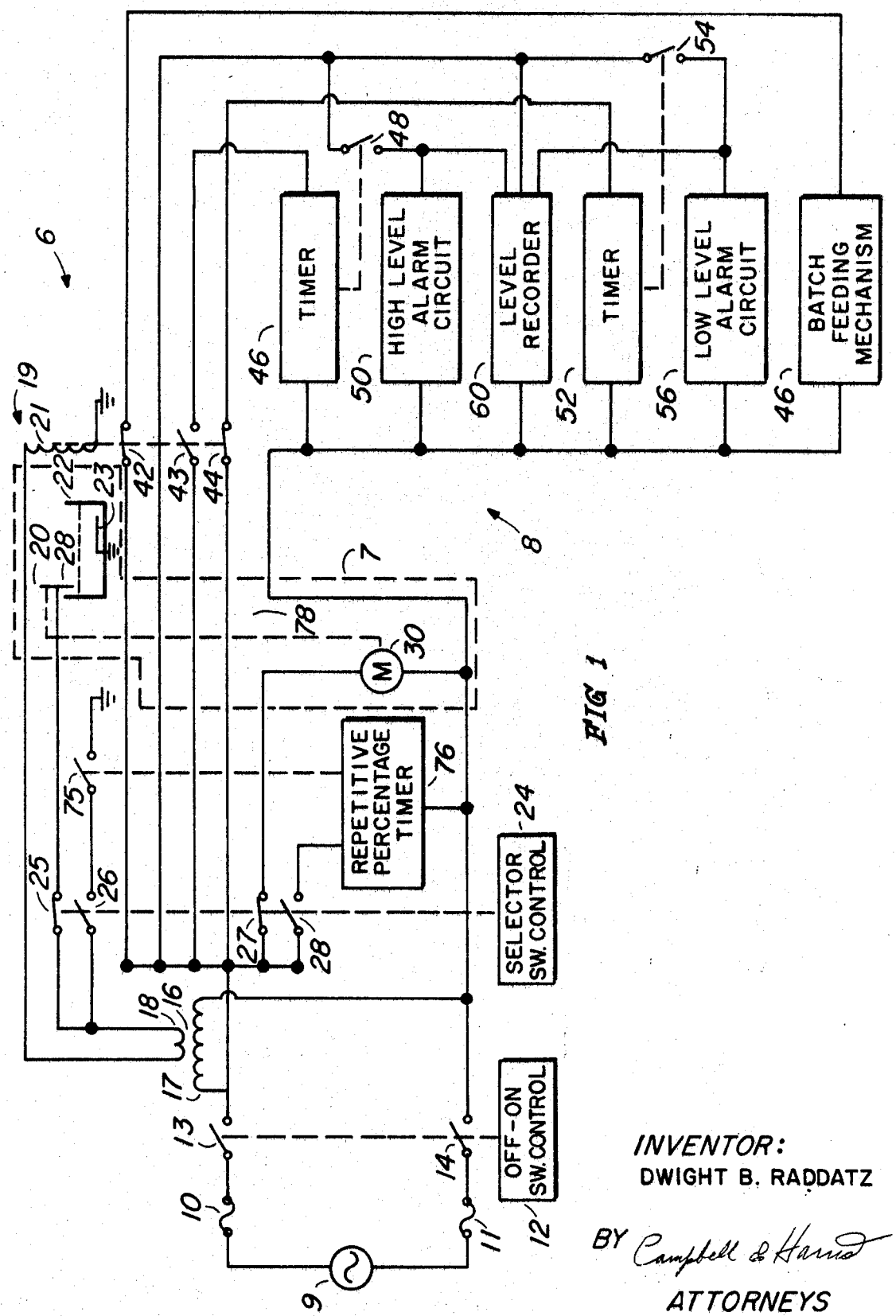

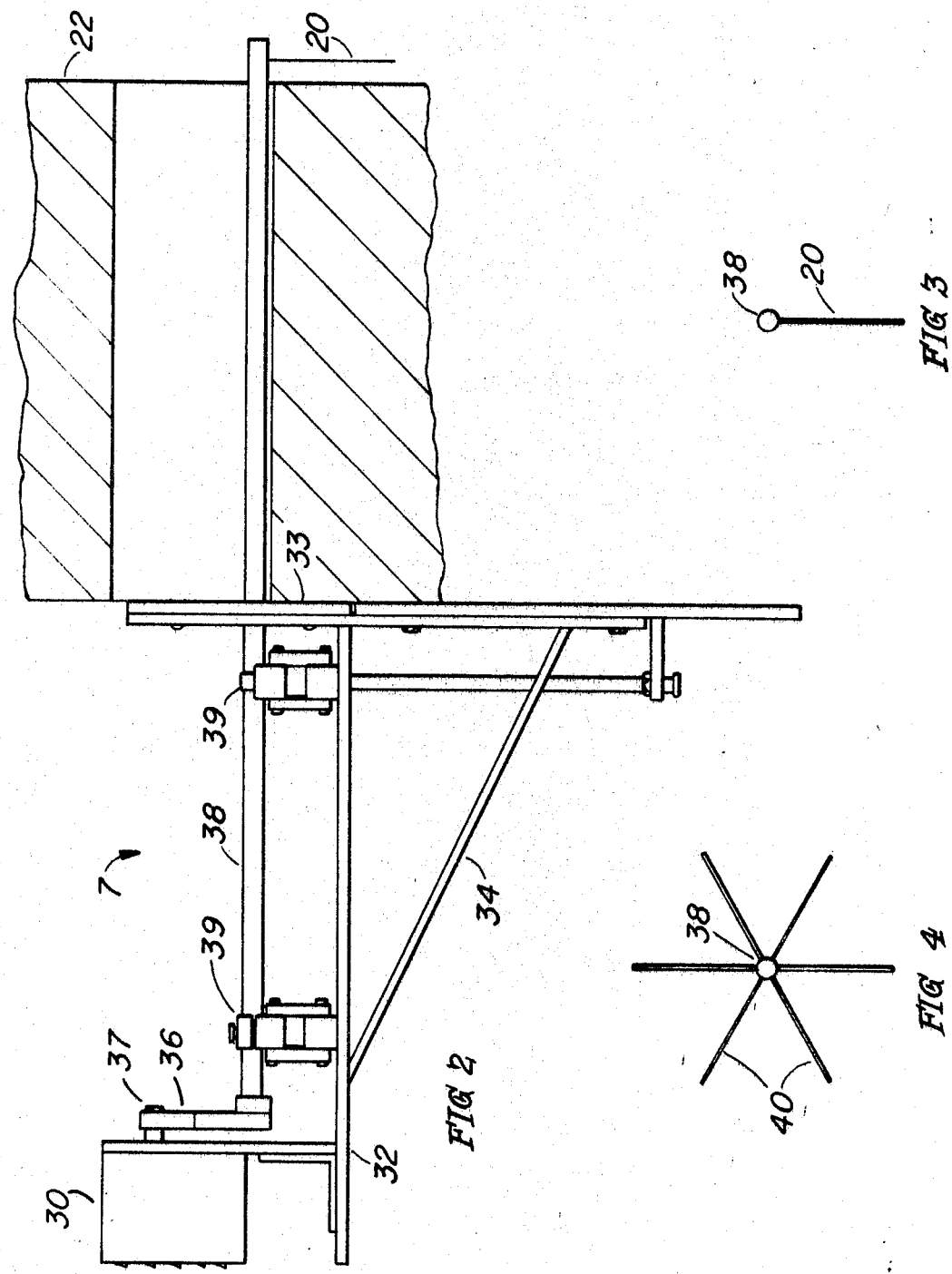

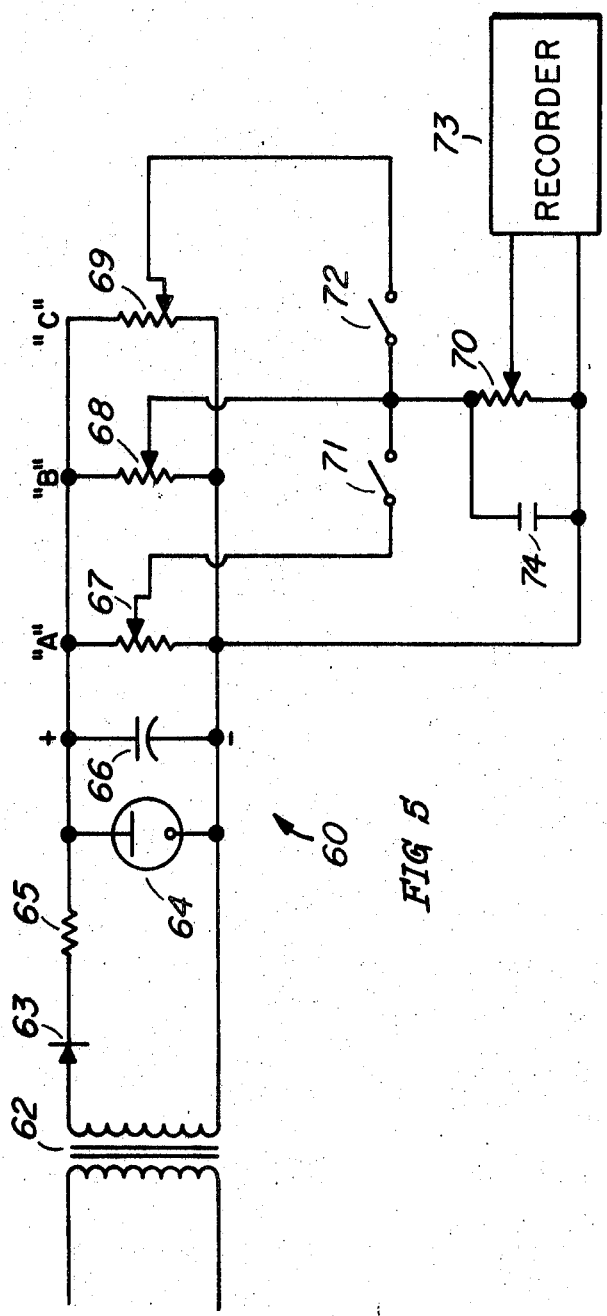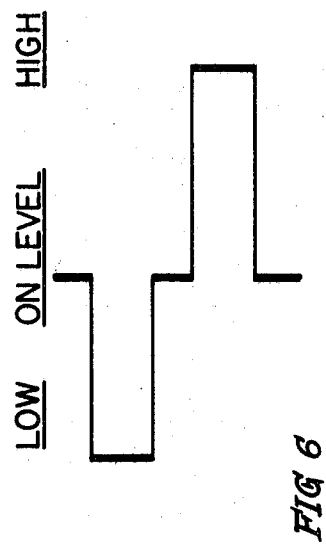

1

3,525,090
ELECTRONIC MONITORING AND CONTROL
APPARATUS
Dwight B. Raddatz, Muncie, Ind., assignor to Ball Corporation, Muncie, Ind., a corporation of Indiana
Filed Dec. 19, 1966, Ser. No. 602,679
Int. Cl. G08b 23/00
U.S. Cl. 340—244                    3 Claims

ABSTRACT OF THE DISCLOSURE

An electronic monitoring and control apparatus having a probe oscillated by a motor for engaging glass in a container to monitor the level of the glass and give an alarm indication if too high or too low and automatically control the rate of feed of glass batch to the container in proportion to deviation of level from a predetermined desired level by means of an electrical unit with a relay energized by contact of said probe with the surface of the glass in the container, a three-stage record of the glass level in the container also being made.

---

This invention relates to an electronic monitoring and control apparatus and more particularly to an improved apparatus for monitoring the level of molten glass and automatically maintaining said level between predetermined limits.

Monitoring devices have found increasingly wide usage in industry and this is particularly true in the glass industry where the level of molten glass in a container such as a forehearth must be carefully monitored and controlled for efficient operation in forming glass articles. Since molten glass in such a container is necessarily withdrawn during operation, glass batch must be constantly added at substantially the same overall rate as withdrawal of molten glass to maintain a given level.

While various devices have been suggested and/or utilized heretofore to monitor the level of molten glass, and while various other devices have been suggested and/or utilized to both monitor and control the level of molten glass, none of these devices have proved to be completely successful, due, at least partially, to a lack of operational dependability, failure to preclude erroneous fault indications, and/or inability to maintain a given level within acceptable tolerances.

It is therefore an object of this invention to provide an improved monitoring and control apparatus capable of dependable condition monitoring and dependable control within a narrow range.

It is another object of this invention to provide a glass level monitoring and control apparatus capable of both monitoring the level of molten glass and indicating deviation of the level when outside a narrow predetermined range and controlling said level to maintain the same within said predetermined range under normal conditions.

It is still another object of this invention to provide an improved monitoring system that substantially precludes erroneous fault indications.

It is still another object of this invention to provide an improved glass level control system having circuitry including an electrode movable in a manner such that the level may be maintained within a heretofore unobtainable narrow predetermined range.

It is yet another object of this invention to provide a glass level monitoring and control system which includes recording means for automatically recording high, low and normal levels.

2

With these and other objects in view, which will become apparent to one skilled in the art as the description proceeds, this invention resides in the novel construction, combination and arrangement of parts substantially as hereinafter described, and more particularly defined by the appended claims, it being understood that such changes in the precise embodiment of the herein disclosed invention are meant to be included as come within the scope of the claims.

The accompanying drawings illustrate one complete embodiment of the invention according to the best mode so far devised for the practical application of the principles thereof, and in which:

FIG. 1 is a schematic and block diagram of the monitoring and level control system of this invention;

FIG. 2 is a side view of the motor and probe assembly shown mounted on the side of a glass container;

FIG. 3 is an end view of the preferred embodiment of the probe shown in FIG. 2;

FIG. 4 is an end view of an alternate embodiment which might be used in lieu of the probe shown in FIG. 3;

FIG. 5 is a schematic diagram illustrating the level recorder shown in block form in FIG. 1; and FIG. 6 is graph illustrating the three-level readout of the recorder shown in FIG. 5.

Referring now to the drawings, the numeral 6 refers generally to the monitoring and control system of this invention. As shown in FIGS. 1 and 2, the level of the molten glass is monitored by a motor and probe assembly 7, which assembly is connected with electronic circuitry 8 for indicating deviations from a predetermined level range and for maintaining the level within the predetermined range under normal conditions.

As shown in FIG. 1, power is supplied to the system by means of a conventional AC power supply 9 through fuses 10 and 11 and an OFF-ON switch, which includes switch control 12 controlling switches 13–14 at opposite sides of the supply source. Power supply 9 provides a desired voltage output, usually either 110 volts or 220 volts, and is preferably a conventional 60 cycle source.

A step-down transformer 16 having a primary winding 17 and a secondary winding 18 is provided to step the incoming voltage down to 30 volts for use by the level determining portion 19 of the assembly (which includes probe 20 of motor and probe assembly 7) and relay winding 21 (which controls the rate of batch feed and timers for high and low level indications as brought out more fully hereinafter). As shown in FIG. 1, the reduced voltage circuit includes secondary winding 18 of transformer 16 connected in series with relay winding 21 (one side of which is grounded) and probe 20. Probe 20 is mounted so as to be engageable with the surface of the molten glass in a container, or forehearth, 22, and since molten glass is conductive, a grounded electrode 23 in contact with the glass completes the probe electrical circuit.

A selector switch control 24 controlling four switches 25–28 is provided for switching between automatic and predetermined rate control for batch feed. In FIG. 1, switches 25–28 are shown set for automatic control with switch 25 closed so that the probe circuit is completed whenever probe 20 is in contact with the glass in container 22.

Probe 20 is preferably oscillated by means of conventional motor 30, which motor is connected to the power source when switch 27 is closed. As shown in FIG. 2 of the drawings, motor 30 is mounted on the side wall of the glass container 22 by means of horizontal platform 32, which platform may be anchored to the wall in conventional fashion such as by vertically positioned plate 33 in contact with the side wall and support arm 34 extending from the lower portion of the plate to the outer portion of the platform.

An insulation drive arm 36 is connected at one end to the motor shaft 37 of the motor and is connected at the other end to one end of an Inconel rod 38, this type of rod having proved to be particularly well suited for use in this invention and enhances the dependability of the apparatus. Inconel rod 38 is mounted in bearings 39 and extends through an opening in the container and has probe 20 attached thereto within the container. Rod 38 is mounted so as to normally be above the glass level to be maintained so that the probe is engageable with the surface of the glass (the probe being electrically conductive, and preferably a 13% platimum-rhodium rod that is about 4-inches in length). It has been found preferable to cause probe 20 to be reciprocated, or oscillated through an arc of about 15° in one direction from vertical, although rotation can also be utilized.

In lieu of single probe 20, a plurality of probes 40 may be utilized, as shown in FIG. 4. If a plurality of probes are utilized, rod 38 is rotated rather than oscillated.

Relay winding 21 controls three relay switches 42, 43, and 44. Switch 42 is connected in series with a conventional batch feeding mechanism 46 so that batch is fed to container 22 only when switch 42 is closed, as it is whenever relay winding 21 is not energized (assuming, of course, that switches 13–14 are closed to provide power to the system).

Switch 43 is normally open and is closed only when relay winding 21 is energized. This switch controls actuation of conventional timer 46 since switch 43 and timer 46 are connected in series across the power source leads. Timer 46 starts a time cycle whenever power is supplied to the timer and each time power is terminated the timer assumes its original position so that an output is produced from timer 46 only if the timer receives power for a full timing cycle, preferably three minutes. An output will be produced by timer 46 therefore only if relay winding 21 is energized and remains energized (i.e., the probe remains constantly in contact with the glass in container 22) for the full timing cycle of timer 46. When this occurs, switch 48 is closed by timer 46 to energize a high level alarm circuit 50 to indicate that the glass level of container 22 is above acceptable limits. High level alarm circuit 50 is conventional and can include visual or audible indications, or both.

The remaining switch controlled by relay winding 21, switch 44, is normally closed and is open only when relay winding 21 is energized. Switch 44 controls activation of timer 52, which timer is conventional and operates in the same manner as does timer 46. Thus, when relay winding 21 is de-energized, timer 52 starts a timing cycle (this could also occur when OFF-ON switches 13–14 are closed and the probe is not in contact with the glass to energize relay winding 21). If this timing cycle is not interrupted by energization of relay winding 21, timer 52 will cause switch 54 to be closed at the end of the timing cycle (again preferably three minutes). When switch 54 is closed, low level alarm circuit 56 is energized. Low level alarm circuit 56 is conventional and, like alarm circuit 50, may include audible or visual indications, or both. Low level alarm circuit 56 will therefore remain inoperative so long as the glass level is sufficiently high in container 22 so that the probe contacts the surface to energize relay winding 21 at least once during any timing cycle of timer 52.

From the foregoing, it can be readily appreciated that the level of the glass is constantly monitored. By causing the probe to be brought into contact with the surface of the glass by moving the probe in an arc, rather than moving the entire probe vertically; for example, it has been found that more precise limits can be established to thus narrow the range between high and low distinguishable levels.

In addition, a level recorder 60 may be provided, as shown in FIGS. 1 and 5. As shown in FIG. 1, level recorder 60, in addition to being connected to the power supply leads, is connected to be energized when switch 48 is closed to energize the high level alarm circuit 50 and is also connected to be energized when switch 54 is closed to energize the low level alarm circuit 56. As shown in FIG. 5, the AC voltage received by level recorder 60 is fed through transformer 62 to a rectifier 63. The rectified output voltage is regulated by a regulating device 64, such as, for example, a thyrathron tube or Zener diode, connected to diode 63 through resistor 65. The regulated DC voltage is filtered by means of capacitor 66, said capacitor being potentiometers 67, 68, and 69 connected in parallel therewith. The center taps of potentiometers 67 and 69 are connected to one side of potentiometer 70 through high and low level switches 71 and 72, respectively, while the center tap of potentiometer 68 is directly connected to the same side of potentiometer 70. High and low level switches 71 and 72 are controlled by the high and low inputs so that the high level switch is closed when the high level alarm circuit is energized and the low level switch is closed when the low level alarm circuit is energized. The center tap of potentiometer 70 is connected to a conventional recorder 73 and a capacitor 74 is connected across the ends of potentiometer 70. The other recorder connection is to the other end of potentiometers 67, 68, 69 and 70, as shown in FIG. 5.

The center tap of potentiometer 68 is adjusted so that approximately one-half of the regulated voltage is coupled from potentiometer 68 while the center taps of potentiometers 67 and 69 are adjusted so that more than one-half and less than one-half of the regulated voltage is coupled from potentiometers 67 and 69, respectively.

The center tap of potentiometer 70 is used to establish the center point readout on a graph such as shown in FIG. 6. If so centered, occurrence of a high level to close switch 71 (to thus change the resulting voltage coupled to the recorder) causes a high level indication, as shown in FIG. 6. Likewise, if a low level should occur to close switch 72, a low level is recorded because of the resulting voltage to the recorder, as also shown in FIG. 6.

When selector switch control 24 is set for predetermined rate control rather than automatic control, switches 25 and 27 are open while switches 26 and 28 are closed. This disconnects the probe from the probe circuit and connects a ground to one side of secondary winding 18 through switches 26 and 75, the latter of which is controlled by repetitive percentage timer 76. Repetitive percentage timer 76 is conventional and merely causes switch 75 to be closed for a predetermined period during each timing cycle. Timer 76 is energized by closing switch 28, while the opening of switch 27 causes motor 30 to be de-energized. When operating in the predetermined rate control mode, batch is fed to container 22 during each period that switch 75 is closed. This allows for both emergency feeding while the probe is inactivated for any reason and also gives a steady rate feed if desired at any time.

During operation in the automatic mode, the probe is oscillated in container 22 by motor 30. If the glass level is below the point where contact of glass and probe can be made, then relay winding 21 will not be energized and batch will be constantly fed to container 22 by batch feeding mechanism 46. In addition, timer 52 will cause energization of low level alarm circuit 56 after the time cycle of the timer.

As the glass level reaches a height where contact is made with the glass surface, the resulting circuit completion will energize relay winding 21. This will only be momentary when the level is just at the point where the probe barely touches the surface but the contact time will increase as the level continues to rise. During the period when the relay winding 21 is energized, switches 42, 43, and 44 will be caused to change position. Since relay winding 21 will be alternately energized and de-energized, the timers 46 and 52 will not time a complete cycle and no alarm circuit will be energized. In addition, opening and closing of switch 42 will cause less batch to be fed to container 22 since batch feeding is disrupted when switch 42 is open. Thus, when the level is such that the probe is in contact with the glass for only a short time, less batch will be fed to container 22 than was the case when no probe contact was made with the glass. As the level rises, the rate of batch feed is further reduced since the probe contacts the glass for a greater length of time to thus energize relay winding 21 for a greater length of time. Thus, the control system achieves a rate of feed that is proportional to the level deviation from the desired level. As the level rises toward the desired level, the rate of feed is reduced. In like manner, as the level is caused to fall toward the desired level, the rate of feed is increased. When the desired level is reached, the rate of feed is held steady, the rate in all cases being controlled by the time that switch 42 is closed in relation to being open.

If the glass level rises to a point where the probe is constantly in contact with the glass, then relay winding 21 remains energized to stop the feeding of glass batch by batch feeding mechanism 46 since switch 42 remains open. In addition, since switch 43 remains closed, timer 46 will cause energization of high level alarm circuit 50 after the timing cycle.

Thus, it can be seen from the foregoing that this invention provides a dependable monitoring and control apparatus that is particularly well adapted for use in monitoring glass level and also maintaining that level within a narrow level range.

What is claimed is:
1. A glass level monitoring system, comprising: input means adapted to be connected with a source of electrical power; a probe engageable with the surface of molten glass in a container; a relay; circuit means connecting said relay, probe and input means so that whenever said probe is in contact with said glass said relay is energized; a first timer actuated by said relay and energized only during energization of said relay; a first alarm circuit connected with said first timer and operable after said first timer has been continuously energized for a predetermined time interval; a second timer actuated by said relay and energized only when said system is operating and when said relay is de-energized; and a second alarm circuit connected with said second timer and operable after said second timer has been continuously energized for a predetermined time interval.

2. A glass level monitoring and control system, comprising: input means adapted to be connected with a source of electrical power; a probe engageable with the surface of molten glass in a container; a relay; circuit means connecting said relay, probe and input means so that whenever said probe is in contact with said glass said relay is energized; a first timer actuated by said relay and energized only during energization of said relay; a first alarm circuit connected with said first timer and operable after said first timer has been continuously energized for a predetermined time interval; a second timer actuated by said relay and energized only when said system is operating and when said relay is de-energized; a second alarm circuit connected with said second timer and operable after said second timer has been continuously energized for a predetermined time interval; and a glass batch feeding mechanism operationally controlled by said relay so that batch is fed to said container whenever said system is operating and said relay is de-energized.

3. A glass level monitoring and control system comprising: a source of electrical power; a step-down transformer; an Inconel rod, a probe mounted on said Inconel rod and engageable with the surface of molten glass in a container; a motor connected to said power source and said Inconel rod for moving the free end of said probe in an arc; a relay; circuit means connecting the secondary of said step-down transformer in series with said probe and said relay so that contact by said probe with said glass energizes said relay; a first timer connected to said power source and energized only during energization of said relay; a first alarm circuit energized only after said first timer has been continuously energized for a predetermined period of time, said first alarm circuit indicating a high level of glass in the container; a second timer connected to said power source and energized only when said system is operating and said relay is de-energized; a second alarm circuit energized only after said second timer has been energized for a predetermined period of time, said second alarm circuit indicating a low level of glass in the container; a batch feeding mechanism operationally controlled by said relay so that batch is added to said container whenever said system is operating and said relay is de-energized; switch means for disengaging said probe from said circuit means and said motor from said power source; and a third timer for connecting said relay to said step-down transformer after a predetermined time interval following actuation of said switch means to disengage said probe and motor.

References Cited
UNITED STATES PATENTS

| | | | |
|---|---|---|---|
| 2,799,848 | 7/1957 | Glantz et al. | 340—244 |
| 3,392,379 | 7/1968 | Thomason et al. | 340—371 |
| 2,483,333 | 9/1949 | Cannon et al. | 340—247 |
| 2,503,654 | 4/1950 | Centofanti | 340—244 |
| 2,535,142 | 12/1950 | Kongelbeck | 73—290 |
| 2,585,607 | 2/1952 | Whitmore et al. | 340—244 |
| 2,625,593 | 1/1953 | Voorhies et al. | 340—244 |
| 3,126,741 | 3/1964 | Weber-Klein | 73—290 |
| 3,229,523 | 1/1966 | Boyd et al. | 73—290 |
| 3,284,788 | 11/1966 | Hudson | 340—239 |

JOHN W. CALDWELL, Primary Examiner

D. MYER, Assistant Examiner

U.S. Cl. X.R.

340—309.4